Patented Oct. 24, 1933

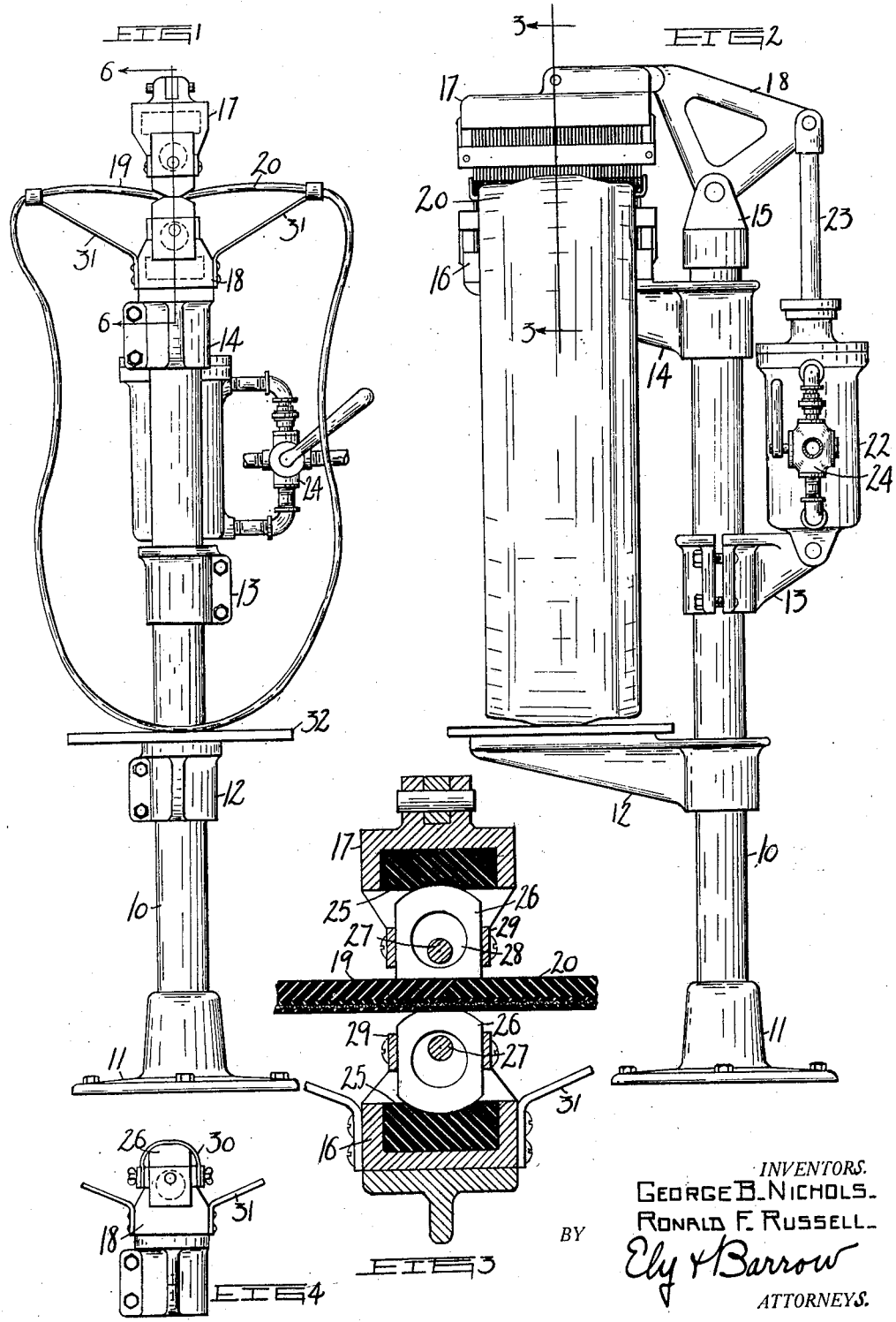

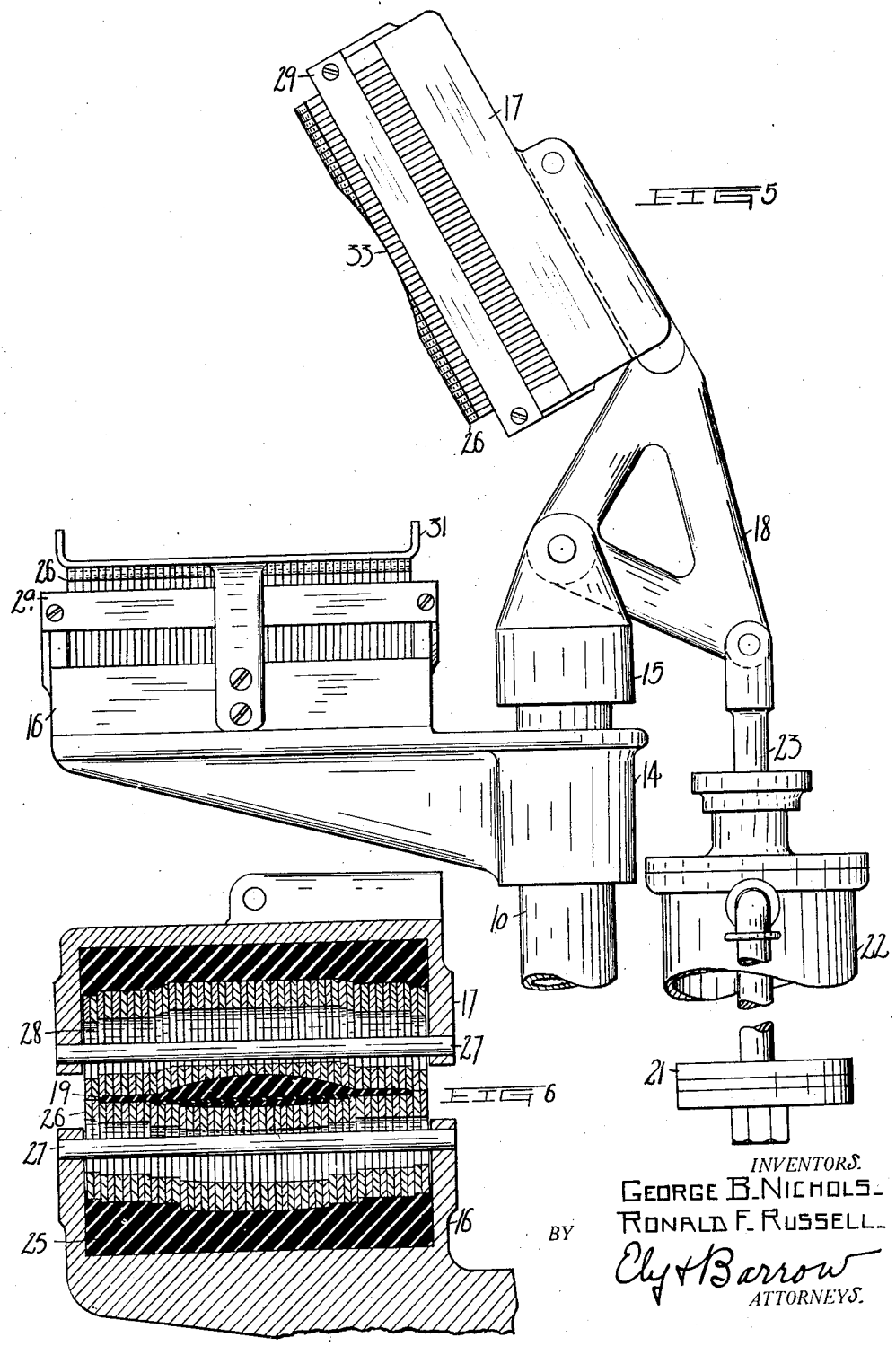

1,932,083

UNITED STATES PATENT OFFICE 1,932,083

BAND SPLICING MACHINE

George B. Nichols and Ronald F. Russell, Akron, Ohio, assignors to The Firestone Tire and Rubber Company, Akron, Ohio, a corporation of Ohio Application August 6, 1927. Serial No. 211,205

2 Claims. (Cl. 154—42)

This invention relates to machines for splicing bands of rubber, leather or the like, having an uneven contour, such as the tread bands used in the building of pneumatic automobile tires.

An object of the invention is to provide a pair of jaws for forcibly clamping together the ends of the band to be spliced. A further object is to provide means for obtaining a resilient pressure on all portions of the uneven contour of the band. Another object is to devise means for disposing the various parts of the machine to make the same accessible for the work to be performed, to eliminate manual operations as far as possible, and to facilitate the rapid splicing of bands thereon.

The foregoing and other objects are obtained by the machine illustrated in the accompanying drawings and described below. It is to be understood that the invention is not limited to the specific form thereof disclosed herein.

Of the accompanying drawings:

Figure 1 is a front elevation of a machine embodying the principle of the invention;

Figure 2 is a side elevation thereof;

Figure 3 is an enlarged scale sectional detail taken on the line 3—3 of Figure 2;

Figure 4 is an elevational detail of a modified clamping platen structure;

Figure 5 is an enlarged scale elevational detail of the clamping platens in open position; and Figure 6 is an enlarged scale sectional detail taken on the line 6—6 of Figure 1.

Referring to the drawings, 10 represents a standard having a base 11, and serving as a support for a table bracket 12, a cylinder bracket 13, a platen bracket 14, and bell crank bracket 15. A lower platen 16 is mounted on bracket 14, and an upper platen 17, attached to a bell crank 18 pivoted to bracket 15, is adapted to be swung down upon the lower platen to clamp two band ends 19 and 20 therebetween for splicing the same. The upper platen is actuated by the piston 21 of a double acting cylinder 22 hingedly attached to bracket 13, the piston being connected by a piston rod 23 to bell crank 18. The cylinder is fluid-pressure operated and is controlled by a four-way valve 24 for raising and lowering the upper platen. Each platen is formed with a recess in which is mounted a block of rubber 25 or like resilient material serving as a cushion for a series of pressure plates or laminations 26. The latter are held in position by a bar 27 passing through central apertures 28 therein and by bars 29 engaging the sides thereof. Each plate 26 is independently and resiliently reciprocable in a vertical direction against its respective cushion whereby when a band of irregular or curved contour is clamped between the platens, each plate will be separately forced against the band so that the composite edge surfaces of the plates will follow the contour of the band to thus distribute the pressure of the platens to all portions of the surfaces of the band. To further equalize the pressure of the clamping surfaces and eliminate roughness thereof, a sheet of rubber 30 may be clamped about the outer surfaces of the plates 26, if desired, as illustrated in Figure 4. A pair of brackets 31 are provided for supporting the end portions of the bands to be spliced and where the machine is to be used for forming endless bands, a table 32 may be provided for supporting the lower end of the band.

The machine may be employed for splicing bands of any character, but is especially adapted for use in splicing endless tread bands to be utilized in the building of pneumatic tire casings. In the manufacture of such tread bands, an unvulcanized, composite strip consisting of a cushion strip, rubberized breaker strip, and tread gum, is cut to proper length with its ends oppositely tapered or skived, and has a coating of cement or rubber solvent applied to said ends. For this type of band the upper series of plates may be formed with a curved recess 33 to accommodate the relatively thick central portion of the tread.

In the operation of the machine of the invention, valve 24 is turned to permit fluid pressure to raise the upper platen as illustrated in Figure 5. The opposite ends of the band to be spliced are next drawn over brackets 31 and placed together over the center of the lower platen. Valve 24 is then turned to permit the fluid pressure to force the piston upwardly and clamp the upper platen down upon the overlapping band edges, as shown in Figures 1 and 2, forcing the laminations of the pressure surfaces into contact with the band ends, the plate ends finding their way into all crevices, corners, and curves across the contour of the band. The pressure is allowed to remain for a short space of time, then the upper platen is raised. The band upon removal will be found to be securely spliced, all portions of its edges being inseparably joined. In addition to the superior results obtained, the swinging of the upper platen out of the way makes the device easily accessible and along with the simplicity of manual operations, permits rapid production and a decrease in labor required for this step in the process of tire building.

Modifications of the construction herein disclosed may be resorted to without departing from the spirit of the invention or the scope thereof as defined by the appended claims.

What is claimed is:

1. A press particularly adapted for splicing bands of uneven contour, which comprises relatively movable cooperating platens both of said platens being provided with a resilient cushion, and means cooperating with said cushions for distributing the pressure of the platens across all portions of the cross-sectional contour of the ends of the bands to be spliced, one of the platens being pivotally mounted with respect to the other platen through a pivoted bell crank adapted to be operated to swing said platen away from the other platen to clear same between each pressing operation whereby the surface of said other platen will be unobstructed to facilitate arrangement thereon of the ends of the band to be subsequently spliced.

2. A band splicing press comprising cooperating platens having a configured operative face or faces formed by edge plates assembled as a yielding series of units against a resilient backing, one of the platens being pivotally mounted with respect to the other platen through a pivoted bell crank adapted to be power-operated to swing said platen away from the other platen to clear same between each pressing operation whereby the surface of said other platen will be unobstructed to facilitate arrangement thereon of the ends of the band to be subsequently spliced.

GEORGE B. NICHOLS.
RONALD F. RUSSELL.